United States Patent [19]

Laing et al.

[11] 4,350,143
[45] Sep. 21, 1982

[54] SOLAR POWER STATION HAVING GROUPS OF SOLAR COLLECTORS

[76] Inventors: Nikolaus Laing; Ingeborg Laing; Oliver Laing, all of 7148 Remseck, 2, Hofener Weg 35-37, Aldingen, Fed. Rep. of Germany

[21] Appl. No.: 290,006

[22] Filed: Aug. 4, 1981

Related U.S. Application Data

[60] Continuation-in-part of Ser. No. 59,606, Jul. 23, 1979, abandoned, which is a division of Ser. No. 620,250, Oct. 6, 1975, Pat. No. 4,172,766.

[30] Foreign Application Priority Data

Sep. 30, 1975 [DE] Fed. Rep. of Germany ....... 2543687
Oct. 7, 1975 [IT] Italy ............................... 28024 A/75
Oct. 8, 1975 [FR] France ................................. 75 31612
Oct. 9, 1975 [JP] Japan ................................. 50-121388
Oct. 9, 1975 [GB] United Kingdom ............... 41446/75

[51] Int. Cl.³ .............................................. F24J 3/02
[52] U.S. Cl. .................................. 126/415; 126/424; 126/436; 126/449
[58] Field of Search ............... 126/415, 416, 430, 436, 126/437, 449, 438, 439, 424, 425; 4/498, 503

[56] References Cited

U.S. PATENT DOCUMENTS

| | | | |
|---|---|---|---|
| 1,209,956 | 12/1916 | Gesell | 126/415 |
| 3,932,997 | 1/1976 | Best | 126/415 |
| 3,933,628 | 1/1976 | Varani | 126/415 |
| 4,082,081 | 4/1978 | McColgan et al. | 126/415 |
| 4,162,824 | 7/1979 | Ma | 126/439 |
| 4,214,572 | 7/1980 | Gonder | 126/425 |
| 4,227,511 | 10/1980 | Margen et al. | 126/424 |
| 4,235,221 | 11/1980 | Murphy | 126/425 |
| 4,270,232 | 6/1981 | Ballew | 4/498 |
| 4,289,112 | 9/1981 | Roseen | 126/415 |
| 4,300,530 | 11/1981 | Tetirick | 126/449 |

Primary Examiner—Daniel J. O'Connor
Attorney, Agent, or Firm—Pennie & Edmonds

[57] ABSTRACT

A solar power station comprising two groups of solar collectors joined together to form an annular platform which floats on a body of water. Each of the collectors of one group has a solar absorbing layer which is in thermal communication with heat carrier fluid ducts and a plurality of spaced upstanding walls are included on an upper surface of the solar absorbing layer. Each of the collectors of the second group includes means for concentrating solar radiation onto ducts carrying a heat carrier fluid. Heat storage areas submerged in water are thermally connected to the groups of collectors and are positioned beneath the platform. Means are provided for rotating the platform so that the spaced parallel walls remain parallel to sun rays throughout the day.

21 Claims, 16 Drawing Figures

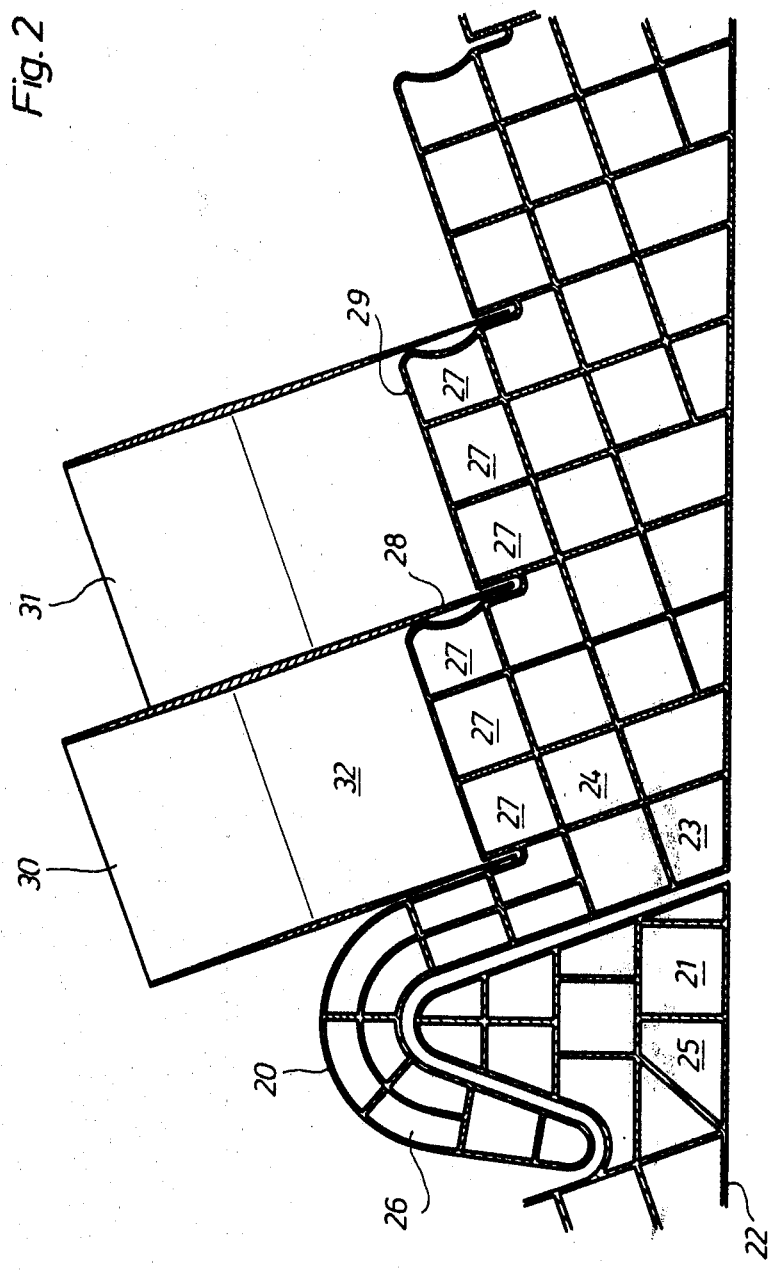

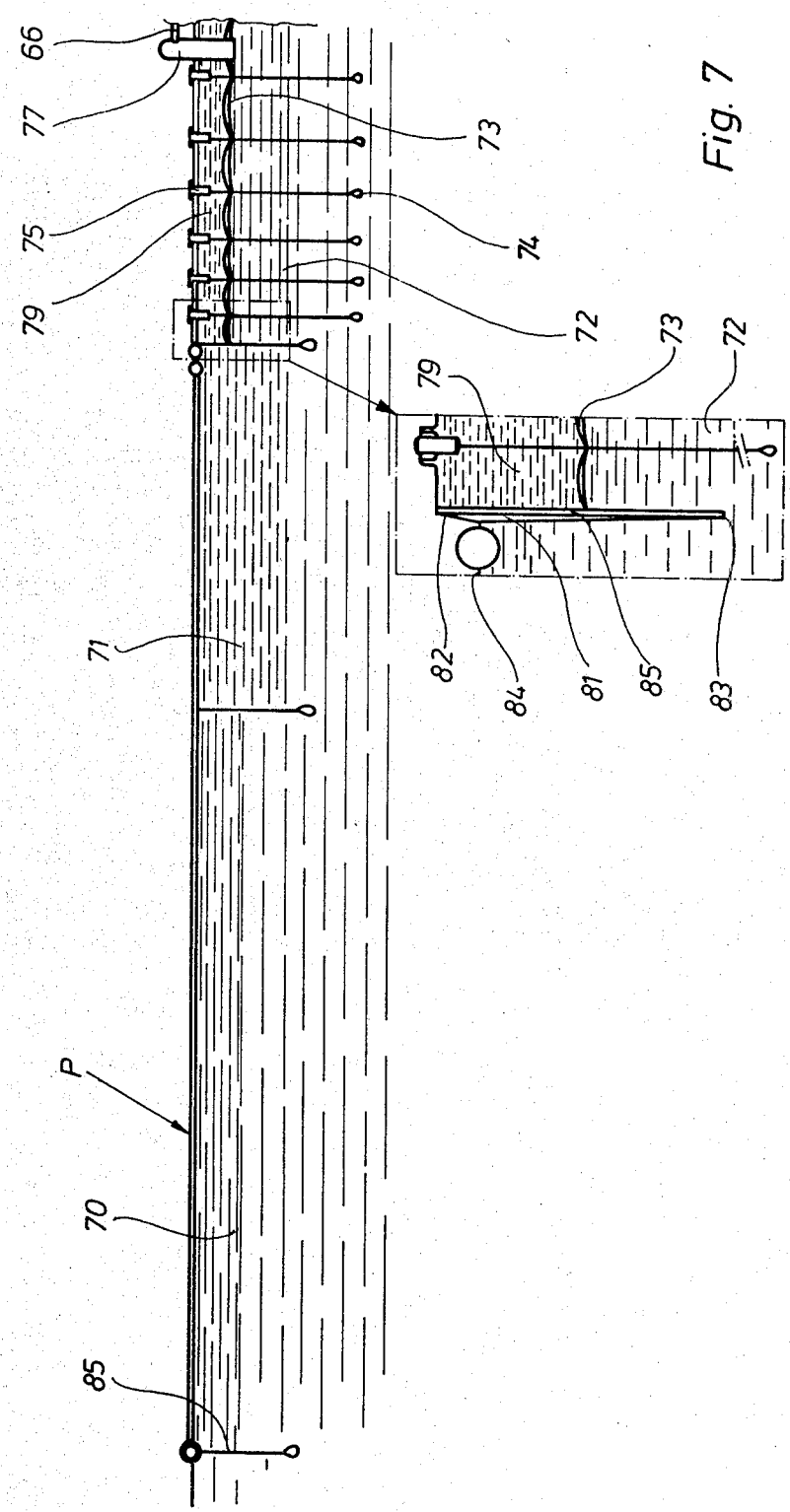

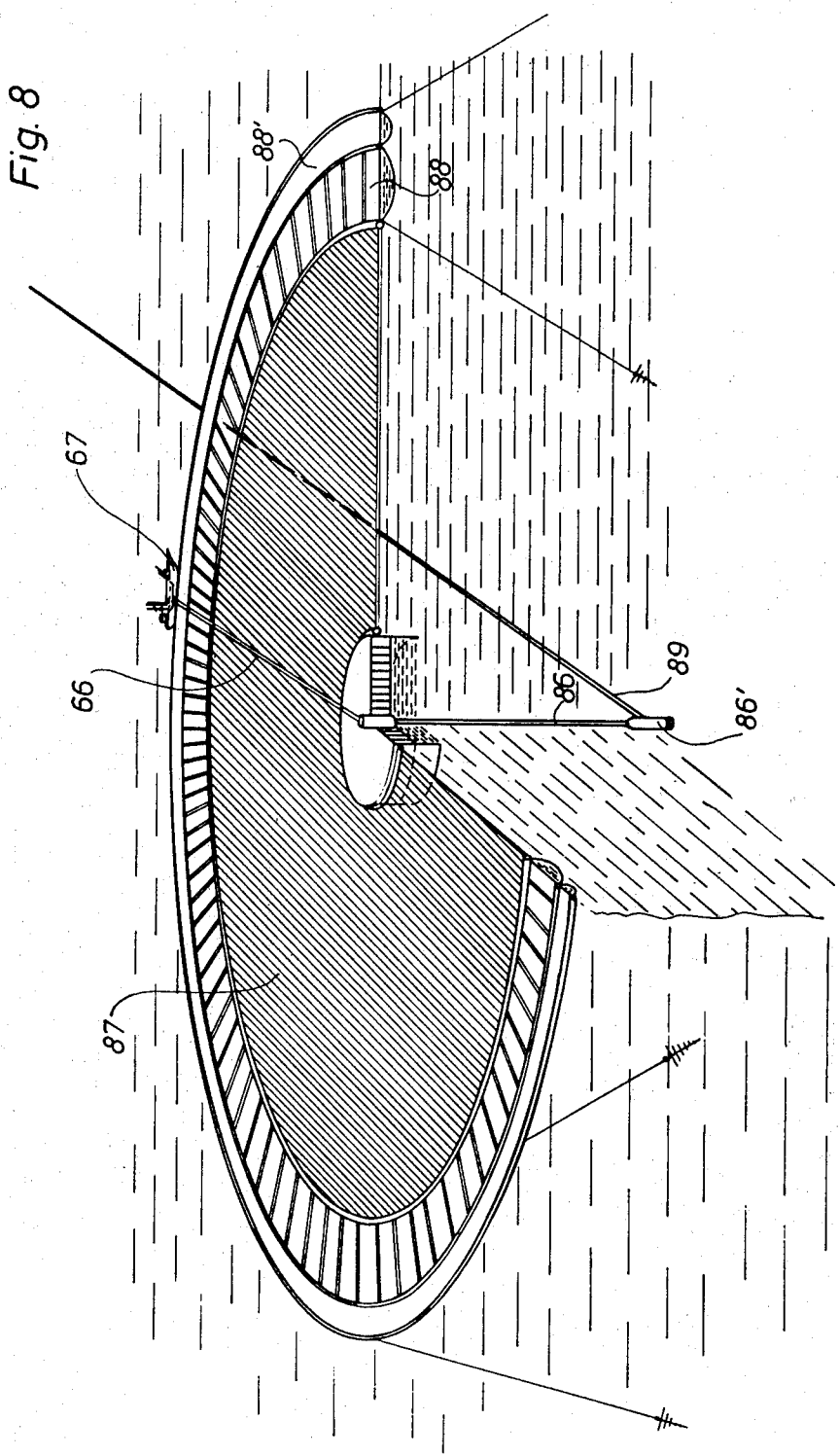

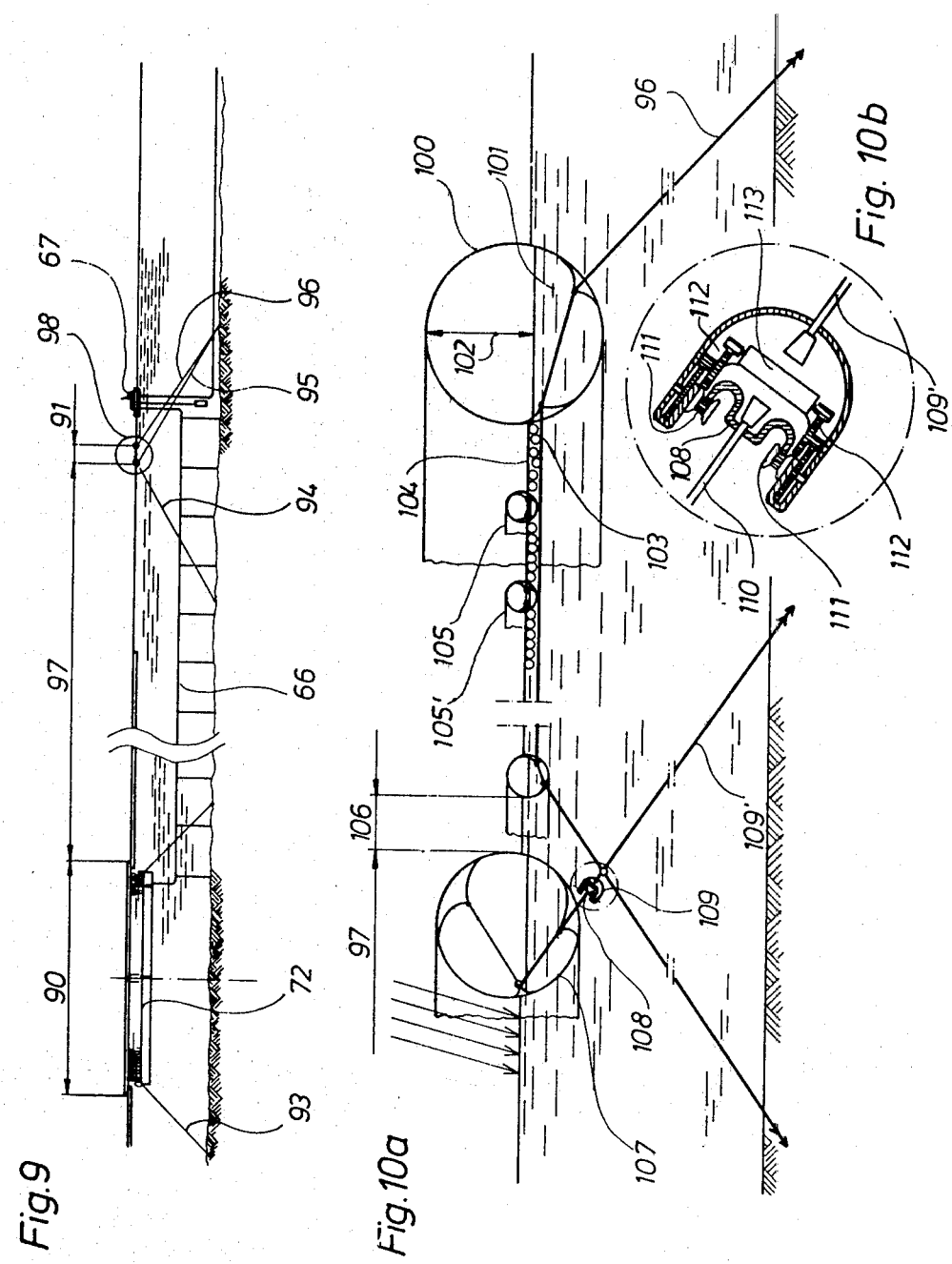

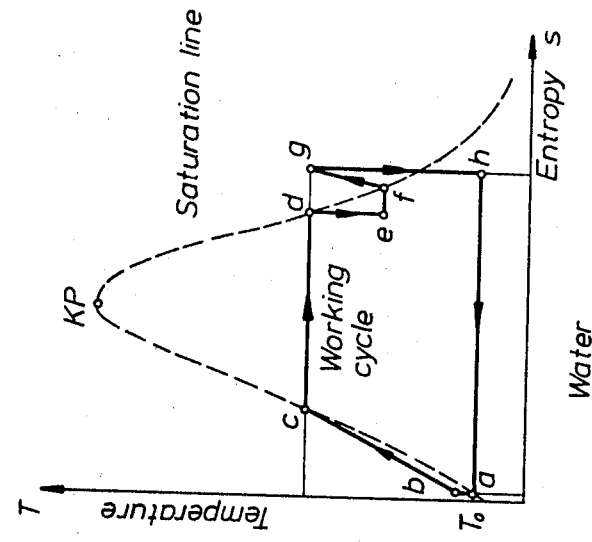
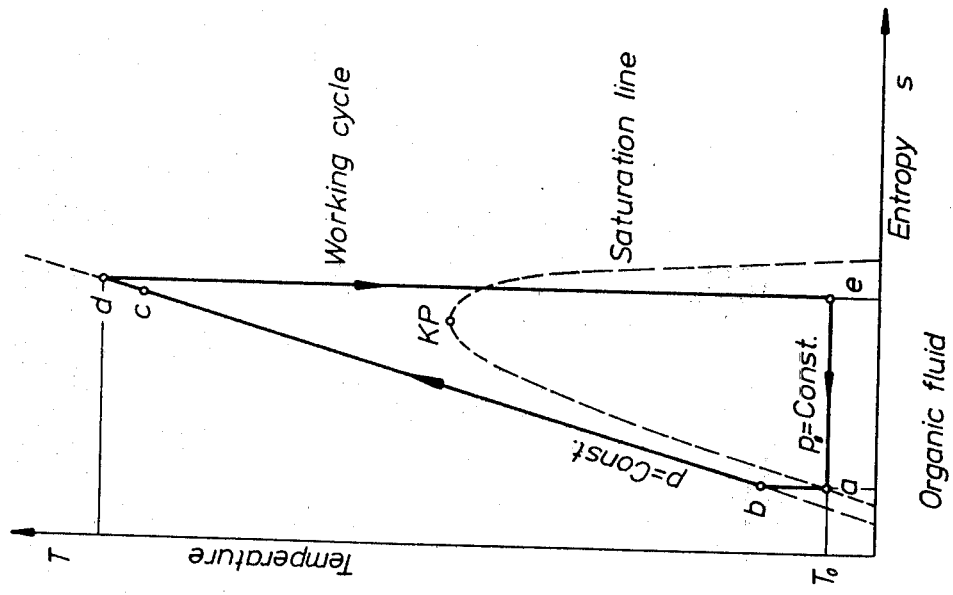
Fig. 12

SOLAR POWER STATION HAVING GROUPS OF SOLAR COLLECTORS

CROSS-REFERENCE TO OTHER APPLICATIONS

This application is a continuation-in-part of our co-pending application Ser. No. 059,606 filed July 23, 1979, now abandoned, which in turn is a division of application Ser. No. 620,250, filed Oct. 6, 1975 and now U.S. Pat. No. 4,172,766.

FIELD OF THE INVENTION

This invention relates to solar power stations and more particularly to solar power stations having solar collectors covering a large area and adapted to float on a body of open water.

BACKGROUND OF THE INVENTION

Solar power stations proposed to date have been subjected to a variety of design problems some of which are as follows:

The area covered by the power station needs to be 200–400 times larger than a conventional power station;

Flat surfaces are essential for structural simplicity of solar collectors and for maximum utilization of solar radiation;

Tracking of the solar collectors to follow the sun requires complex mechanical systems;

Contamination of the air reduces incident radiation and leads to deposits of dirt on the collector surfaces;

Cooling towers utilized to condense working fluid of turbines require a multiple of heat exchange surface areas compared with those of conventional power stations;

The cost of known forms of heat storage for storing heat during nighttime or cloudy periods is much higher than that of a complete nuclear power station of comparable power output.

Attempts have been made to overcome some of these problems. For example equipment has been proposed in which solar radiation is focussed by reflectors which are tracked in the direction of the sun in the vertical elevation as well as in the horizontal azimuth by complicated mechanical means. Solar collectors in the form of blackened foil cushions have been proposed which are stretched over hot water storage accumulators and float on a water surface.

It is known to utilize parabolic mirrors to concentrate solar energy on ducts situated at the focal axes of the mirrors and where the ducts convey a fluid heat carrier. Insofar as the collectors heat a heat carrier flowing through them, the known collectors are built as rigid mechanical structures. For reasons of strength, these collectors have to be relatively small and owing to the low energy flux density of solar radiation, only relatively small power flows can be economically converted by a collector which is limited in size. The conversion of solar thermal energy to electricity can only be accomplished economically if power flows are made available in a magnitude similar to those of conventional power stations. This need requires solar collectors having dimensions measured in square kilometers.

It is therefore an object of our invention to provide for a solar power station which may have a power output similar to that of a conventional power station.

GENERAL DESCRIPTION OF THE INVENTION

Broadly a solar power station constructed according to our invention utilizes large area flexible solar collectors joined together in groups to form a platform supported on an open body of water.

Each of the solar collectors of one group of collectors has a flexible solar radiation absorbing layer in thermal contact with ducts carrying a heat carrier fluid. The solar radiation absorbing layer has a plurality of spaced parallel vertical walls upstanding thereon which serve as an insulation layer to prevent loss of heat by convection from the absorbing layer. A further insulation layer is positioned below the absorbing layer and includes floatation means for supporting the collector on a body of water. The vertical spaced parallel walls together with the solar radiation layer between the walls form channels which are open to ambient air. These open channels eliminate the need of glazed covers which tend to reflect some of the solar energy and to absorb short waves of the solar spectrum reducing the amount of solar energy impinging onto the absorbing layer. Further the channels permit the use of photovoltaic layers which may convert 5 to 10% of the solar energy into DC electricity while the remaining energy may be converted into usable heat. The collectors are assembled into a first group to form an annular floating platform held together by peripheral elements such that the platform may withstand radial forces.

Each of the collectors of a second group of collectors have solar concentration means in the form of mirrors by which solar energy may be focussed onto heat carrying fluid ducts to further increase temperature of the carrying fluid.

A further feature of the invention is that means are provided for rotating the platform on an open body of water such that the vertical walls on the solar absorbing layer of the collectors of the first group track the direction of the sun.

A fluid heat carrier is pumped through the ducts of the collectors to extract heat therefrom. The heat so extracted heats up a quantity of water, stored for example, in a heat storage area immersed in the water. The heat serves for heating the working fluid of a turbine. In order to reject the energy of condensation of working fluid exhausted from the turbine, cold water from the depths is pumped into a condenser and is heated therein by absorbing the heat of condensation. The heated depth water used for condensation may then, according to the invention, be utilized in a biological process for protein production. To this end, the depth water, which contains a high concentration of products of biological disintegration is fed, after being heated by the condensation energy, into breeding basins which are exposed to solar radiation where it is converted into algae. In turn, the algae can be used to feed mussels and other animals for producing animal protein.

It is a distinguishing feature of the invention that the solar collectors are used in a platform, which can be designed as a floating platform, where the collectors are not only capable of performing all the functions necessary to convert solar energy but where the platform comprising the collectors may be subjected to any desired translational and rotational motion over the surface on which if floats. This facility has not been achieved by any of the solar collector systems known hitherto.

An analysis shows the difficulties associated with previously proposed solar power stations as outlined above and are overcome in a power station according to the invention utilizing a floating offshore design. This is because:

- only the open sea offers unlimited areas for solar collectors free of cost;
- only the open sea offers horizontal flat surfaces;
- the diurnal rotation of a collector platform fulfills the sun-tracking requirement;
- provided the distance from the shore is adequate, there is no air contamination and consequently no dirt deposited on the collectors; and
- condenser cooling by cold depth water replaces not only the entire cooling tower installation of conventional power stations but also increases the thermodynamic cycle efficiency.

BRIEF DESCRIPTION OF THE DRAWINGS

FIG. 2 is a partial longitudinal cross-section of a further embodiment of a solar collector according to the invention;

FIG. 7 is a radial cross-section of a portion of a floating platform having a solar collector system according to the invention;

FIG. 8 is a perspective partial cross-sectional view of the floating platform illustrated in FIG. 7;

FIG. 9 is a radial cross-sectional view of the rotating and stationary areas of a power station according to the invention;

FIG. 10a is an enlarged view of a portion of FIG. 9;

FIG. 10b is an enlarged sectional view of a portion of FIG. 10a;

FIG. 12 is a diagram of entropy and pressure of a steam circuit and of an organic circuit for a power plant according to the invention;

DESCRIPTION OF THE PREFERRED EMBODIMENTS

Figure 1:
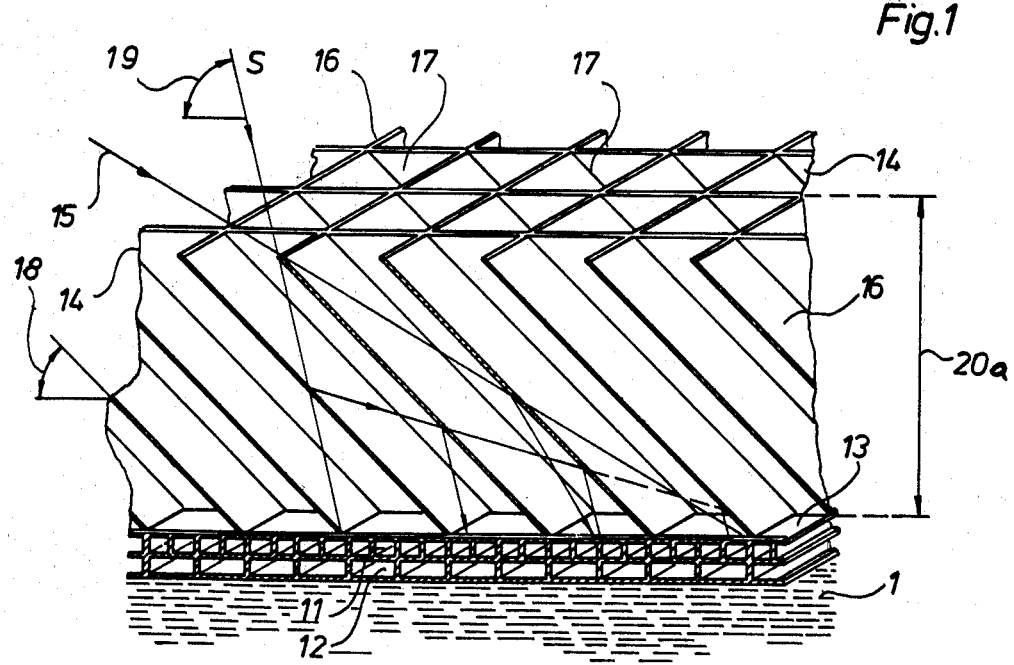
FIG. 1 is a perspective cross-sectional view of a cut-out from a solar collector according to the invention.

FIG. 1 shows a perspective cross-section through a cut-out of a solar collector of a first group of collectors according to the invention. An extruded profile of synthetic material with a large number of, for example, rectangular ducts 11 serves as a collector layer which conducts a fluid heat carrier. A lower insulating layer comprising larger air-filled ducts 12 is positioned beneath ducts 11 and serves simultaneously as floats to support the collector on the water 1. A solar absorbing layer 13 is deposited over ducts 11 to face the sun. The solar absorbing collector layer 13 has means for reducing convection losses in the upward direction which means comprise a plurality of spaced parallel wall strips 14 positioned vertically and parallel to the horizontal projection of the solar radiation 15. Spacer elements or bulkheads 16 are positioned between the wall strips to form cells 17. The cross-section of the cells 17 is rectangular. The elements 16 are positioned at an angle 18 which is derived from the position of the sun as determined by the geographic latitude. According to the power demand during the seasons, angle 18 is so chosen that the reflection losses caused by the reflection of the solar radiation from the elements 16 as a consequence of the varying altitude of the sun are kept as small as possible, i.e. so that, within the range of effective solar radiation, single reflection only takes place from these elements 16 rather than multiple reflection. According to the invention, the angle 18 is at a optimum if, during the season in which a maximum energy generation is desired, it is kept just slightly smaller than angle 19 at which a double reflection before reaching the collector surface 13 will occur. The cross-section 17 of the cells is guided by the temperature difference between the collector surface 13 and the ambient air as well as by the total height 20a of the convection-inhibiting walls. The larger the height 20a, the better is the insulation effect though only if the cross-section 17 of the cells is made small enough so that no thermal convection takes place in the obliquely positioned cells. Contrary to glazed collectors, the total solar radiation reaches the absorbing layer 13 and no reflection takes place. In addition, the height 20a and consequently the insulation effect can have any desired value while a glazed collector may only have a very limited height to prevent convection in an insulating air layer.

The solar collector possesses its maximum absorption of radiation only when the walls 14 track the direction of the projection of the sunbeams on a horizontal plane. This tracking is accomplished by rotating the floating solar collector platform. A reflective coating can be applied to the separating walls 14 and the bulkheads 16. The solar radiation absorbing layer 13 possesses selective radiation properties and behaves as a black body in relation to the absorption of solar radiation while it does not emit radiation in the infrared range. This layer may consist alternatively of a semiconducting layer with an upper and a lower collecting layer, serving as a photovoltaic converter. Also this layer absorbs a high percentage of the solar flux because the cell structure prevents losses by reflection. The above design of a solar collector can be used also for purposes other than electricity production.

FIG. 2 shows a further form of embodiment of the collectors illustrated in FIG. 1. The collectors consist of a large number of wide parallel strips which are made by the extrusion of, preferably, polyolefines. Hook-shaped portions 20 are formed along an edge of a strip and engage matching portions 22 of an adjacent strip. The ducts 21, 23, 24 and 25 serve as floats and as an insulation and also inhibit the downward infrared radiation. These ducts are closed at the two axial ends of a strip. A fluid heat carrier, normally fresh water or, at high temperatures, oil or glycol, is conducted through the ducts 27. As before, these ducts 27 communicate at their ends with manifold ducts of a conduit system. The space 28 serves as an insulation. The layer 29 forms the solar radiation absorbing layer of the solar collector. The obliquely positioned cells 30 and 31, which have a rectangular cross-section 32, consist of synthetic material and are also open on top. They are preferably formed from a grating made by injection molding and their walls are thicker in the middle region but taper off both upwards and downwards so that mold portions can be withdrawn from boths sides.

Figure 3:
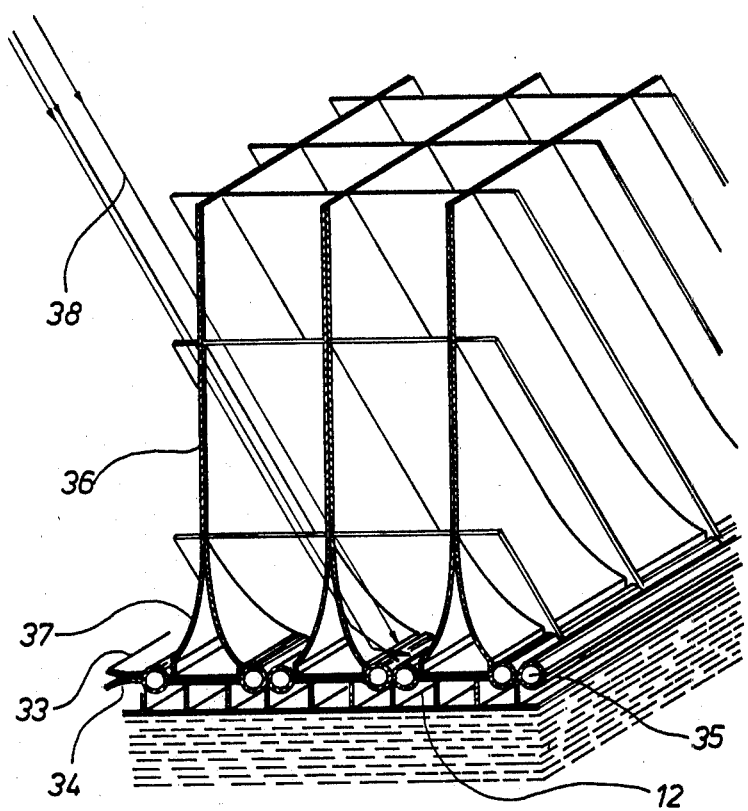
FIG. 3 is a perspective cross-sectional view of a cut-out from a collector having means for concentrating solar radiation according to the invention.

FIG. 3 shows a solar collector including a convection inhibiting means as well as a solar concentration means. As shown, the collector has ducts 35 formed of two foils or sheet metal plates 33 and 34 through which a heat carrier fluid is adpated to flow. The vertical wall elements 36 have a curved portion 37 which serves to force the sun rays 38 onto the ducts 35 to heat the carrier fluid therein. Flotation means 12 serve to support the collector on a body of water. The axes of the ducts should point in the compass direction of the sun.

Figure 4:
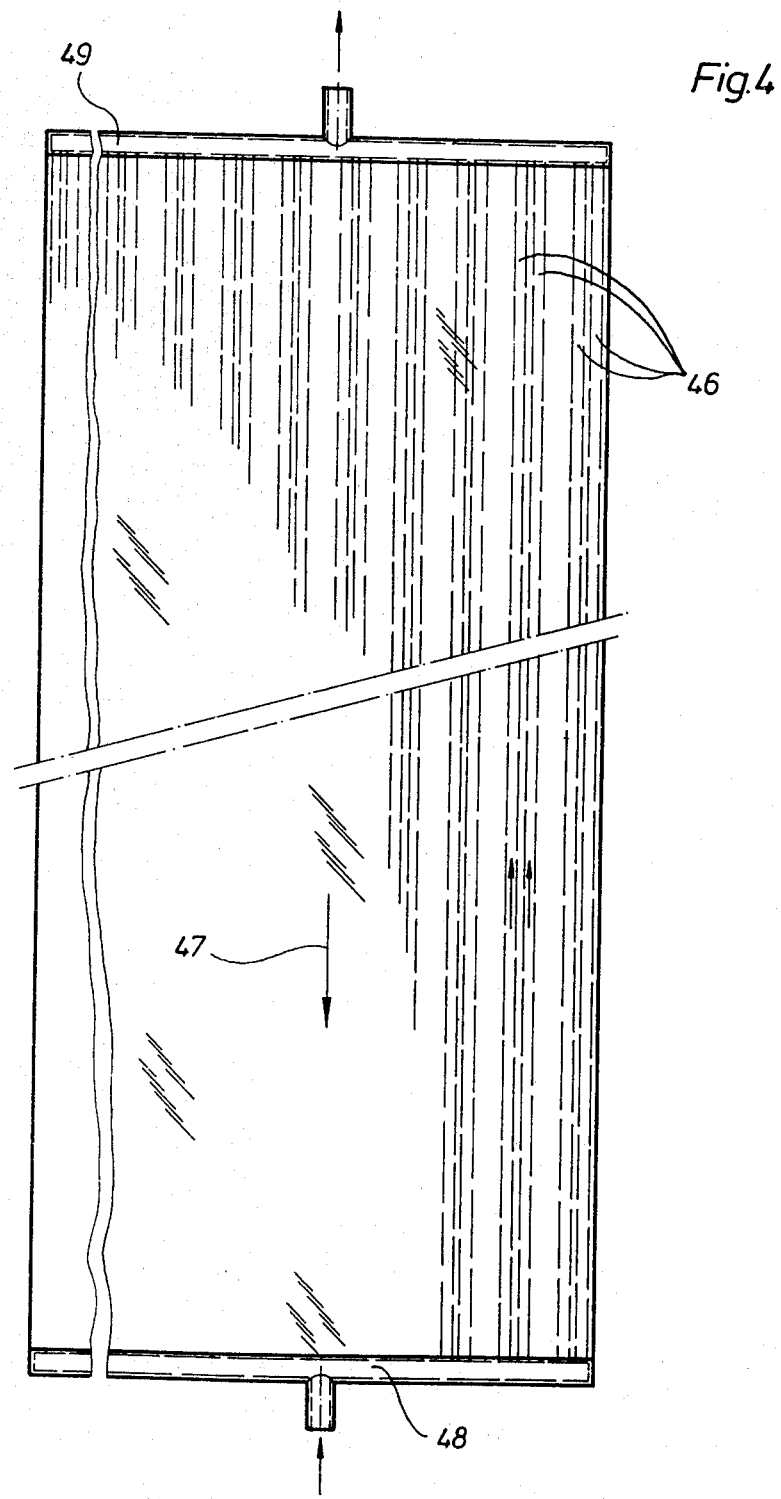
FIG. 4 is a plan view of a solar collector element of the type shown in FIG. 3.

FIG. 4 shows a scaled-down plan view of a solar collector element. Each duct 46 communicates with an inlet manifold conduit 48 and an outlet manifold conduit 49 at the ends of the solar collector panel. The heat carrier flows from the manifold conduit 48 to the manifold conduit 49. The arrow 47 shows the horizontal direction towards the sun.

Figure 5:
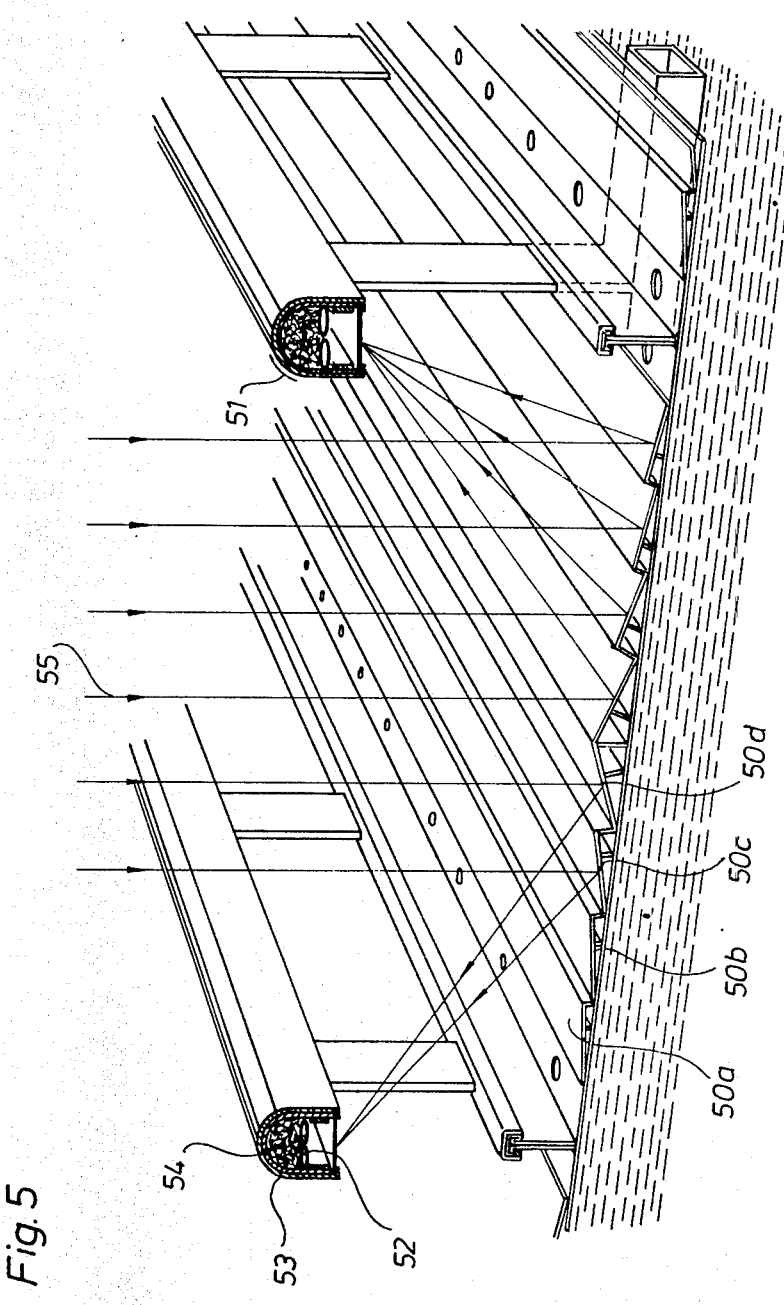
FIG. 5 is a perspective cross-sectional view of a focussing mirror concentrating the sun energy in high temperature collectors.

FIG. 5 shows a second group of collectors where the collectors have a solar concentration means in which final heating of the heat carrier to the working temperature or the accumulator temperature occurs. Metallized extruded profiles having mirror strips 50a, 50b, 50c and 50d direct incident radiation into solar collectors 51 which are transparent to radiation from below. The angle between the mirror surfaces 50 and the horizontal plane increases with the distance of the collectors 51 so that all sun rays 55 reach the radiant absorbent tubes 52. These absorbing tubes 52 are well insulated against the V-shaped hubs 53 by fibers 54.

Figure 6:
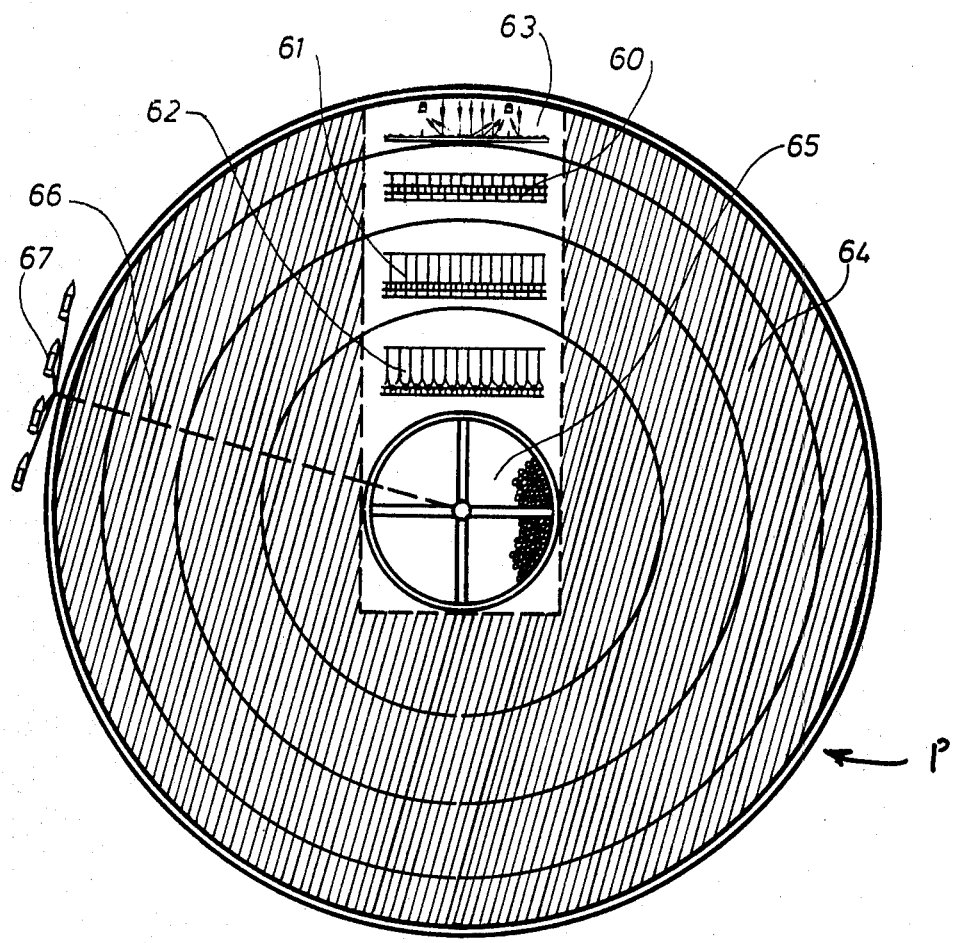
FIG. 6 is a diagrammatic plan view of the arrangement of the solar collector groups according to the invention.

FIG. 6 shows diagrammatically the collectors joined together in groups to form an annular platform having an inner region the collectors 60 and 61 of which are according to FIG. 1, collectors 62 according to FIG. 3 and the mirrored collectors 63 according to FIG. 5. The lines 64 represent the extension of the ducts according to FIGS. 1 and 2 and the mirror strips of FIG. 5. The region 65 in the center contains floats for heat storage and the line 66 is a connection between this heat storage area and the ships 67 equipped with the power stations. The heat carrier fluid is conducted within the first collector group through several regions with gradually increasing working temperatures and increasing height 20a in insulation. Thereafter, a pressure increase takes place to the boiling pressure of the subsequent collector group. The heat carrier is conveyed there through the ducts of a mildly focussing solar collector which is also insulated against the outside air by cells. In this region, heating up to a temperature of about 135° C. takes place. Both collector groups are carried by air filled flotation means which simultaneously form a heat insultaion against sea water lying underneath. The body of water lying below these inboard collector regions is stabilized by annular skirts. This body of water is heated up to a temperature near that of the collector and serves as a low temperature heat accumulator. During the day, owing to the equality of temperatures, heat cannot be released to the accumulator water lying underneath the collector platform. During the night, both the floating ducts lying below the collector layer and the cell screen above the collector layer prevent the cooling of the accumulator water. The collector water is insulated against the sea water lying underneath the accumulator by the stable stratification in the lower region of the accumulator water. A water layer of 3 m thickness has the same thermal insulating value as a porous polystyrene plate of 20 cm thickness.

The series connection of these collector groups leads to an extremely high yield in the conversion of the incident solar radiation because each group is deployed in its optimum working temperature range. In addition, the diffuse radiation is utilized to a large extent. Finally, about 6% of the radiation falling on the flat collectors is directly converted photovoltaically into electric power. Between the groups pumps increase the pressure of the heat carrier so that the heat carrier pressure prevents evaporation at any time. The final temperature will be reached in the area 63.

FIG. 7 shows a cross-section through a platform P with solar collector units according to the invention. Underwater storage areas, namely, 70 for 50° C., 71 for 90° C. and 72 for 175° C., are arranged underneath the solar collectors. The underwater storage area 72 for 175° C. is separated by a cover 73 from the cooler water 79 lying above it. The water 79 creates a pressure which is higher than the boiling pressure of the water in area 72. The weights 74 prevent a lifting of the cover 73 while floats 75 stabilize the cover in its unstable horizontal position. The dome 77 supplies a power plant with overheated pressurized water via a pipeline 66.

The storage area 72 forms a heat storage accumulator which is surrounded by a cylindrical wall 81 which carries hoop stresses and which comprises a coil of glass-reinforced synthetic material. The wall thickness of this cylindrical wall both at its upper edge 82 and at its lower edge 83 amounts to only a few millimeters but, at the level of the water line 84, the wall thickness is at a maximum because the radial pressure reaches a maximum at this level due to the increased pressure of the hotter water within area 72 as compared with the cooler water surrounding it.

The platform has a skirt 85 at its periphery which forms a boundary between the water in storage area 70 and cooler water surrounding it beyond the periphery of the platform. This skirt is also subjected to radial forces as is wall 81 which tend to stretch it and to prevent folds from forming on the surface of the platform because of current or wind forces.

The spaces 70, 71, 72 are open underneath towards the sea or covered with a thin plastic film. Water in the spaces which is thermally stratified in a stable manner acts as a thermal insulation.

Fresh water serves in the low-temperature solar collectors as a heat carrier fluid to feed the solar energy into the thermal storage water bodies. Heat carrier oil or glycol can perform the same function in the high-temperature solar collectors.

A platform P according to the invention is shown in FIG. 8 in a perspective view. A power plant is situated in a power station ship 67 and is connected via pipelines 66 to the dome 77. In addition, a cold water pipeline 86 leads from a pump 86' suspended near the bottom of the sea, along the pipeline 66 to the ship 67. Evaporators and condensors as well as the control rooms of the power station and living quarters are situated in the ship 67. The hatched area 87 of the solar collector platform carries the collector groups for different temperatures according to FIG. 6. A circular basin 88 open at the top surrounds the periphery of the collector platform and serves as a breeding basin as explained further hereafter. Further outboard, another circular channel 88' serves to heat up the depth water. The outermost channel is covered with a foil to prevent infection of the sterile depth water by waves beating over a torous-shaped air hose. The ship 67 is connected to the consumer area by cables following the pipeline 66, 86 and 89.

FIG. 9 shows a centered portion 90 as well as a ring portion 91 which are anchored to the bottom of the sea by ropes 93, 94, 95 and 96. The platform portion 97 is rotatable about its vertical axis once a day. The hot water storage accumulator 72 is connected via the pipeline 66 with the power plant ship 67.

FIG. 10a shows in enlarged scale the area 98 of FIG. 9. The ring portion 91 has on the outside the hose 100 partly filled with water 101 and is anchored by the rope 96 to the bottom of the sea. The height 102 of the hose is higher than the highest expected waves. To the inside follow smaller hoses 103 which are arranged under radial beams 104 which in turn are fixed between the hose 100 and the partly water filled hoses 105 and 105'. If high waves do break over the hose 100, the water from the waves can penetrate only downwardly through the spaces between the hoses 103 while the hoses prevent penetration in the opposite direction by forming a tight surface if bent upwardly against the beams 104. A wide working clearance 106 is maintained between the stationary ring portion 91 and the rotating platform portion 97. Also the platform portion 97 is surrounded by a partly water filled hose 107. This hose is surrounded by a V-shaped rail 108 which is guided through a drive means 109 and is anchored to the ground by a rope 109'.

FIG. 10b shows in enlarged scale a V-shaped rail 108 fixed by ropes 110 to the hose 107 and a drive means 109 anchored by the rope 109' under tension. The drive means has two wheels 111, two gears 112 and an electric motor 113. The platform portion 97 may be rotated by several hundred of these drive means 109 arranged over the circumference and synchronously driven by a frequency controlled AC supply.

Figure 11:
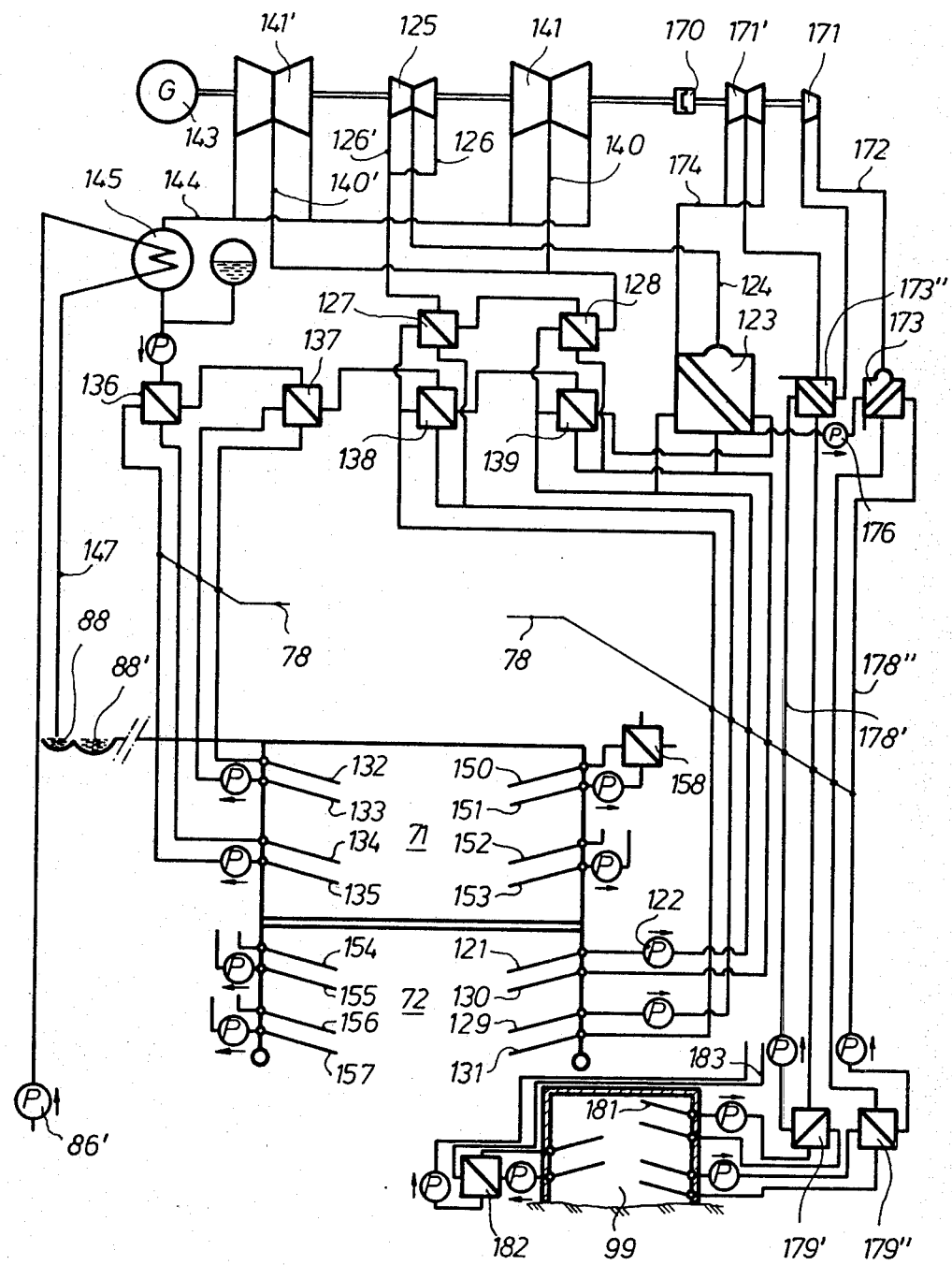
FIG. 11 is a circuit diagram of a power station according to the invention.

FIG. 11 shows a circuit of a power station according to the invention. This power station comprises an evaporator, heat exchangers for pre-heating feed water, turbo-generators and condensers. All this equipment is housed in the power station ship. A tube 121, capable of being swivelled into an appropriate height level, extracts water at a temperature $T_s = 175°$ C. out of the lower storage accumulator 72. The pump 122 performs the pumping. This hot water reaches a hydrocarbon evaporator 123 and there transfers its heat to a condensate of a hydrocarbon working fluid and pre-heats it to boiling temperature. The steam so generated is fed via the pipeline 124 to a medium-pressure turbine 125 made of metal. The steam discharged from this turbine flows through the pipelines 126 and 126' to the superheaters 127 and 128 which also receive heat flow from the lower accumulator 72 through tubes 129 and 121 respectively. At the height level of the inlet of tube 129, adjustable in height, the storage water temperature should amount to about 115° C. and the additional superheating in the superheater 128 is performed by water with a temperature of 175° C. extracted through tube 121. The return flow of the water proceeds through the tubes 130 and 131, both adjustable in height. These tubes 130 and 131 discharge the cooled water into the accumulator 72 at a height level which corresponds to the return flow temperature. Similar inlet and discharge tubes 132, 133, 134 and 135, capable of being swivelled into the desired height level, supply the condensate pre-heaters 136 and 137 with water at temperatures of 50° C. and 90° C., respectively, while the condensate pre-heaters 138 and 139 draw their heat from the circulation in the tubes 121 and 130 or 129 and 131, respectively. The steam from the superheater 128, after intermediate superheating, reaches the low-pressure turbines 141 and 141' via the pipelines 140 and 140'. The temperatures in these turbines are so low that the turbines can be made of glass fiber reinforced synthetic materials and fiber filled injection molded synthetic materials. The turbines drive the generator 143, via the common shaft. The discharged vapor from turbines 141, 141' flows through the manifold pipe 144 to the condenser 145 which receives cooling water from the pump 86' in a sea floor station. The heated cooling water reaches the pre-heating basin 88 at the ring portion 88 and 91 of the solar collector island via the pipeline 147 and, after further heating, flows into the breeding basins 88'. Additional tubes 150, 151, 152, 153 in the low temperature storage accumulator 71 and 154, 155, 156, 157 in the high-temperature storage accumulator, capable of being swivelled into the desirable height level, are connected to the heat exchanger 158 and further heat exchangers (not shown), which are traversed by the fresh water heat carrier fluid of the solar collector. In order to increase the efficiency of the power station, the maximum temperature in special regions of the solar collector is raised to 300° C. The steam turbines 171 and 171' are coupled up through the same shaft, by the interposition of an overrunning clutch 170 to the turbines 141 and 141'. The turbines 171 and 171' draw their steam at 300° C. from the evaporator 173 through the steam pipeline 172. The expanded steam of the turbine stage 171 reaches first the intermediate superheater 173'', which injects new energy from the storage accumulator, and subsequently, the low-pressure part 171'. From there, the steam proceeds into the power manifold 174 and into the evaporator 123 for the hydrocarbon working fluid e.g. butane or a fluorohydrocarbon. The heat of condensation is fed to a hydrocarbon secondary turbine 125. The condensed water from the hydrocarbon evaporator returns through the boiler feed pump 176 to the 300° C. evaporator 173. The feed water pre-heating by bled-off steam, in a manner familiar in nuclear reactor power stations, is eliminated because storage accumulator heat is available in all temperature ranges. The evaporators 173 draw their heat via hot oil pipelines 178' and 178'', respectively, from the heat exchangers 179' and 179'' which, in turn, draw their heat from a lower storage accumulator 99. The hot fresh water with a temperature of 300° C., which is extracted from the storage accumulator at the bottom of the sea, by the tube 181, capable of being swivelled into the desired height level, flows through these heat exchangers 179' and 179''. The feeding in of energy of the thermal charging of the high temperature storage accumulator on the bottom of the sea also proceeds, with the interposition of a heat exchanger 182, via the hot oil in the pipeline 183, which flows, without pressure, through the solar collector ducts (not shown) of the high temperature region and, after cooling down, is returned, via the tube situated underneath, to the storage accumulator.

The hydrocarbon turbines are subdivided into two stages 125 and 141. If the low load power output of the power station is less than 60% of the peak load power output, a further evaporator for the 115° C. temperature range is required. By disengaging the intermediate pressure turbine 125, the generator power output can be reduced down to 30% of the maximum power. By this means, in contrast to all other power stations, energy is fed to the respective turbines at the appropriate generation quality, i.e. on disengaging the steam turbine, the flow of high temperature energy from the 300° C. storage accumulator is discontinued. On additionally disengaging the intermediate pressure turbine 125, the storage accumulator range 72 is shut off in addition so that the only low temperature energy, which can be extracted at the maximum utilization of the solar collector, is utilized.

FIG. 12 explains the distinguishing feature of organic fluids in contrast to water as a working fluid. While the energy content of boiling water is 418 kJ/kg, the energy content of steam at the same temperature is 2 676 kJ/kg. Thus, the enthalpy of the liquid phase is only 16% of that of the vapor phase. In conventional fuel burning steam power stations, the heat is released at temperatures between 1,000 and 2,000° C., i.e at a very high heat grading while the process temperature lies at only 300° C.

The energy of the heat storage accumulator can be subdivided into two groups with different heat grading, namely, on the one hand, the "excess temperature heat" at an accumulator discharge temperature above the working temperature, and, on the other hand, the "pedestal heat" at a temperature below the working temperature. The pedestal heat can be used for heating up the liquid working medium while the energy needed for the subsequent evaporation can be supplied from the excess temperature heat reserve. With water at 100° C. as a working medium, 84% is needed as excess temperature heat. At a working temperature of 175° C., 74% of the heat is required at excess temperature. Only 26% can be usefully supplied at pedestal heat temperature. When using an organic working medium, practically the entire heat can be supplied from the pedestal heat. This difference means that the temperature level of the heat accumulator can be chosen much lower than that for steam, for which the capacity needed at excess temperature is three times the capacity usable at pedestal heat temperature. In practice, this difference is responsible for the fact that, with an organic medium process, 753 MJ can be extracted from a heat accumulator of 200° C. maximum temperature per m$^3$ of stored hot water volume, while the energy content of the same heat accumulator which can be converted into electrical energy when using steam as the thermal prime mover working medium amounts to only 130 MJ. A heat accumulator for steam turbines would thus have to be six times larger than for organic fluid turbines.

This thermodynamic advantage will be apparent with the help of the T,s-diagrams for water and for an organic working fluid. Starting at the level "a" the condensate in both cases is heated up by using the pedestal heat until the working temperature isothermal curve is reached at point "c". Between points "c" and "d" evaporation takes place. With water, making use of intermediate superheating between points "c" and "g", the evaporation requires 300% of the heat needed to reach the working temperature isothermal curve at the point "c". This heat can only be supplied from the excess temperature heat reserve of the storage accumulator. With a organic working fluid, the energy supply is absorbed in the supercritical region on the left side of the saturation line, so that no volume increase takes place during evaporation. Thus, no additional evaporation energy is required, and in this case the excess temperature heat reserve is only needed to maintain the working temperature in all temperature levels of the stored body of hot water. With the organic medium e.g. butane, the liquid phase can absorb almost the entire heat required for the energy conversion. This fact is of decisive significance because the heat source of the solar power station is the heat storage accumulator.

The electrical generators for the solar power station do not differ from those for conventional steam power plants. The turbo-generators which have about the same nominal power output as those in a typical nuclear power station are distributed among several power plant ships. For an output of 10,000 MW, five power plant ships, each supplying 1,800 MW would be needed. A sixth ship would be provided as a stand-by to take over during repairs of one of the other power plants.

Figure 13:
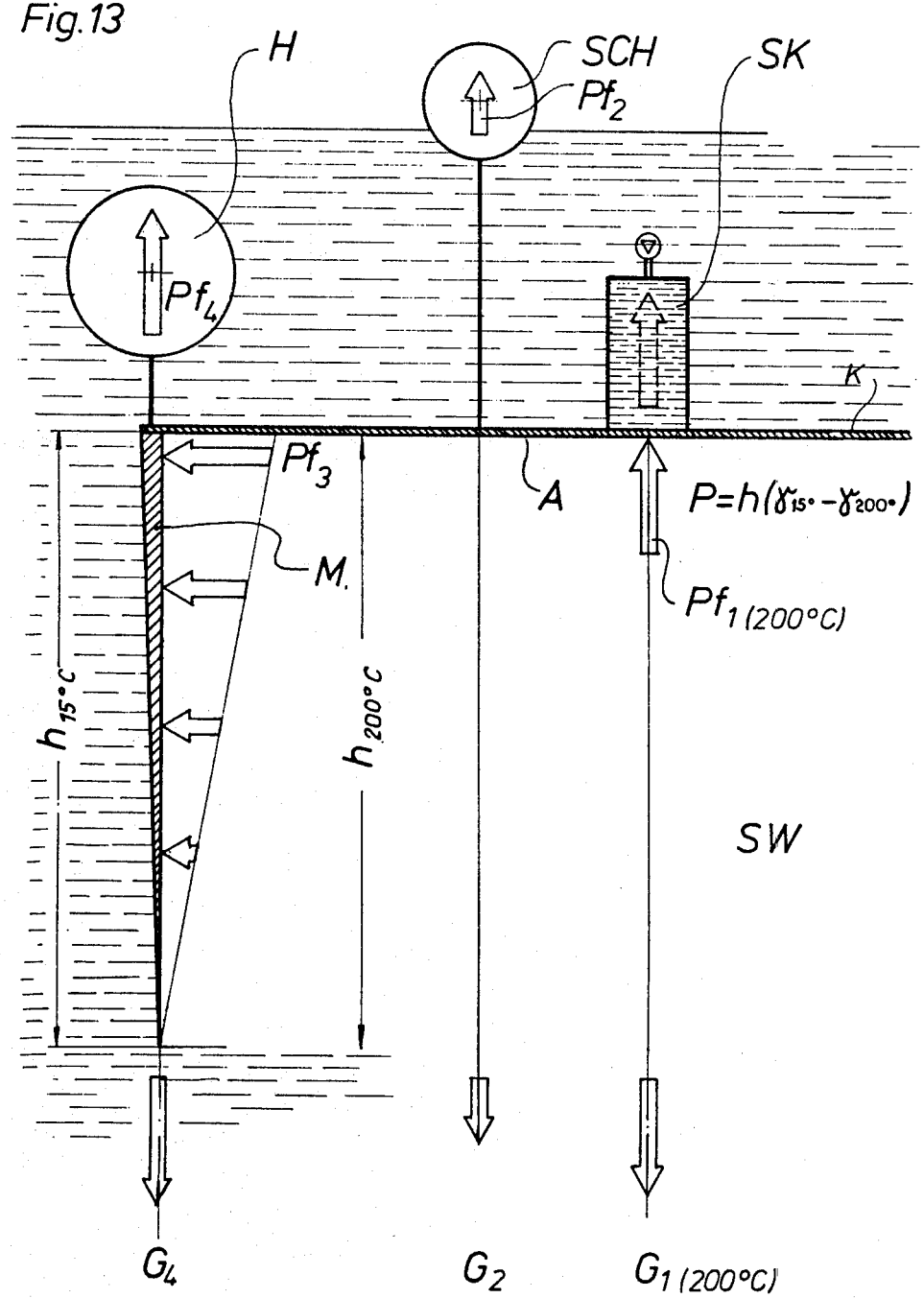
FIG. 13 is a diagrammatic cross-section of a heat storage accumulator according to the invention.

FIG. 13 shows the physical principle of the submerged heat storage accumulator. The bell-shaped container space is surrounded by a cylindrical jacket M. The container is open underneath or closed only by a plastic film, but is covered above by an insulating roof A which separates the hot accumulator water SW from the sea water lying above the container. The buoyancy forces of the enclosed hot water SW, as shown by the arrow Pf$_1$ are balanced by the weight G$_1$. In order to ensure that the roof remains in the horizontal position, floating bodies SCH are provided which generate a buoyancy Pf$_2$. A weight G$_2$ opposes this buoyancy force so that these two forces balance each other. If the accumulator water SW is cooled down during the energy discharge of the heat accumulator, the buoyancy force Pf$_1$ diminishes. To equalize the diminishing buoyancy, a group of buoyant bodies in the form of floating caissons SK are provided. Their internal space is filled with water when the heat accumulator is energy charged but, with increasing energy discharge, the water content in the floating caissons SK is displaced by compressed air. The same pressure, indicated by the arrow Pf$_1$, which acts on the covering roof A causes, due to forces indicated by the arrow Pf$_3$, a hoop stress in the cylindrical jacket M. This stress diminishes in the downward direction and vanishes at the bottom edge of the jacket M. The same forces indicated by the arrow Pf$_3$ generating a hoop stress are used to impart a radial tension to the platform portion 97 of FIG. 9. The jacket M is carried by the floating caissons H.

Figure 14:
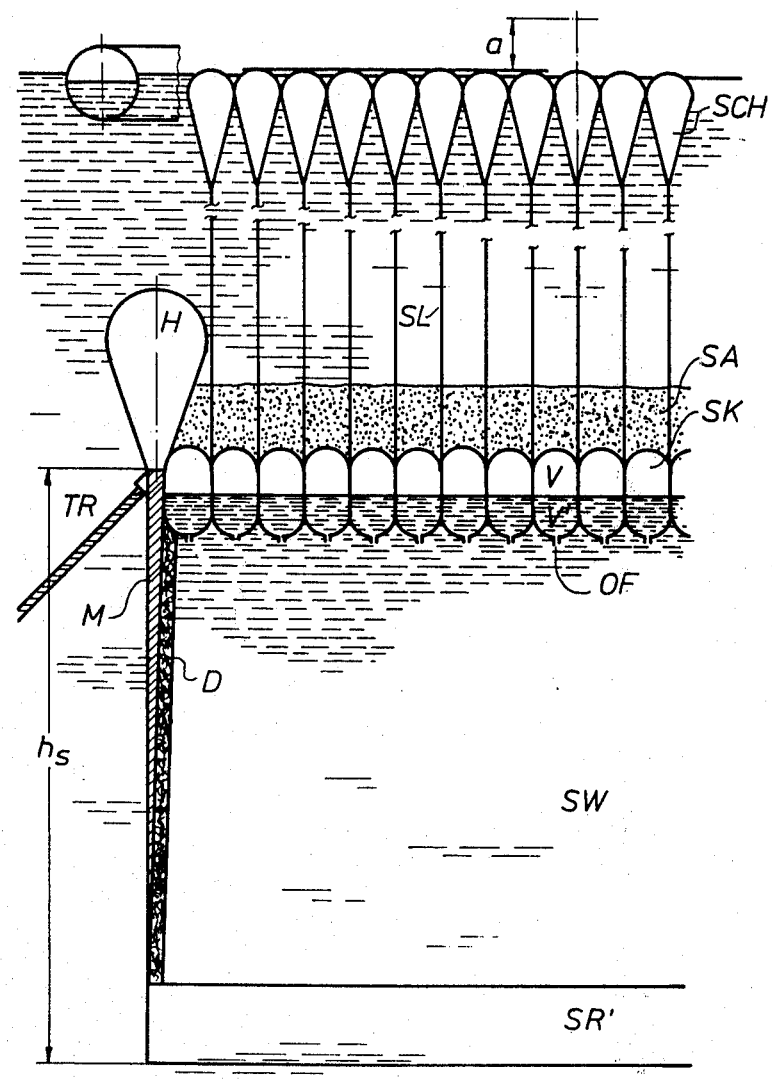
FIG. 14 is a diagrammatic cross-section of the submerged heat storage accumulator shown in FIG. 13.

FIG. 14 shows the structure of a hydrostatically compensated hot water storage accumulator. The jacket M is designed as a steel ring with a wall thickness diminishing downwards. The construction of the ring takes place at the erection site on a floating dock by bonding a continuous steel strip with overlapping joints just above the water surface. The toroidal beading H, filled with compressed air, generates a buoyancy which corresponds to the submerged weight of the jacket including the insulation D. The accumulator roof A comprises caissons SK with a square horizontal cross-section which are tied at the nodal points of four adjacent caissons by the ropes SL to floating bodies SCH made of foil. Instead the weights C$_1$ and C$_2$ of FIG. 13, a sand layer is used, which, when the caissons SK are filled with water, compensates the buoyancy of the hot water SW. With increasing heat discharge of the heat accumulator, a corresponding amount of water is displaced by compressed air from the floating caissons SK. The caissons SK communicate, via an aperture OF, with the hot water SW. The sand layer and gravel layer SA which is about 11 m thick at a vertical extension of the container of about 100 m, simultaneously provides the insulation in relation to the sea water lying above the heat accumulator. The heat insulation of that layer corresponds to foam insulation of 64 cm thickness. In the downward direction, a stable water layer SR' is formed which remains cold even when the heat storage accumulator is charged. This water layer serves as a thermal insulation layer and has the thermal conductivity of water, i.e. $\lambda = 0.58$ W/m²K, which is better than that of the sand SA. For an assumed power output of 10,000 MW, the heat accumulator diameter is 2.4 km. The jacket M is anchored to the sea bed via the ropes TR.

Figure 15:
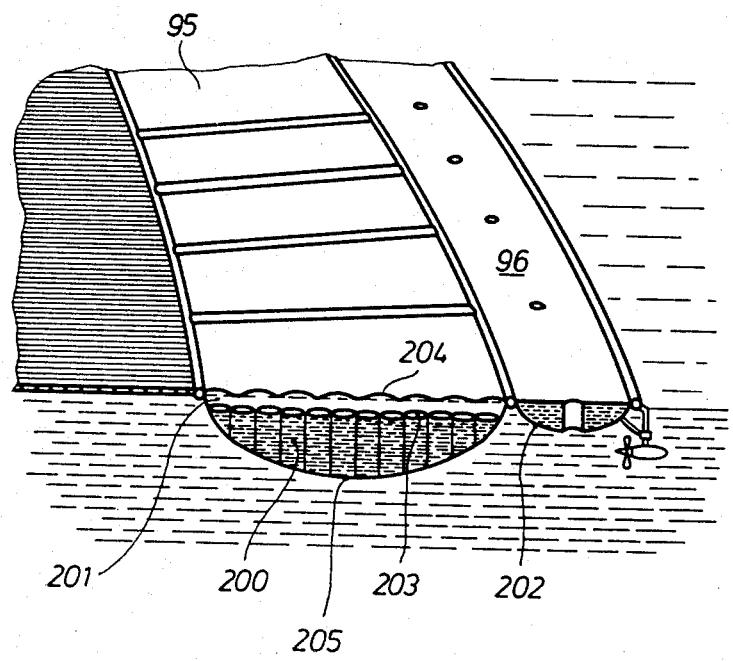
FIG. 15 is a perspective cross-sectional view of a special design of an outer ring comprising breeding troughs.

FIG. 15 shows basins for breeding phytoplankton. The utilization of the non-convertible energy content, accruing in electric power generation, which amounts to 75% of the total absorbed solar energy, may, according to the invention, take place in a biological process station where phytoplankton and marine animals are grown. As is well known, the concentration of nutrient salts in the sea increases with the increasing depth because all the debris of the world oceans are slowly sinking towards the bottom. These nutrient salts transported upwards with the condensor cooling water are then further heated in a blackened solar collector basis 202 which is covered with a platic foil 204 to prevent infection. Biological growth takes place in the upper layer 201 of the trough 205. The heated depth water flows towards the breeding trough through the outer heating basis 202, then through the hollow blackened bottom space 203 of the breeding basin. Because photosynthetic filters absorb only a small percentage of the incident solar radiation, a substantial portion remains for the further heating of the depth water. The breeding of the phytoplankton and of marine animals in depth water heated by the waste heat of power station plant is know per se. Compared with these known features, a feature of the invention comprises in that energy extracted by a solar collector system floating on the surface of the sea is directly utilized in situations for breeding phytoplankton and marine animals.

We claim:

1. A solar power station comprising a first group of solar collectors each of the collectors of which has a solar radiation absorbing layer, a plurality of spaced parallel walls upstanding from said solar radiation layer forming an insulation structure preventing heat loss from said absorbing layer to ambient air and a plurality of first ducts in thermal contact with said solar absorbing layer through which a heat carrier fluid is adapted to flow and to be heated by heat from the heat absorbing layer; a second group of solar collectors each collector of which has a plurality of second ducts, solar concentration means for concentrating solar radiation onto said second ducts to further heat the heat carrier fluid therein; fluid cushion means beneath the collector of the first and second groups to support the same on a body of water; said first and second groups of collectors being joined to form an annular platform rotatable on a body of water; means for rotating said annular platform at a circumferential speed whereby said spaced parallel walls remain parallel to the projection of sun rays in a horizontal plane; and two underwater thermal storage areas each in thermal communication with one group of collectors.

2. A solar power station according to claim 1 wherein the platform is surrounded at its periphery by a skirt immersed in the water and forming a boundary of a heat storage area whereby the water in the storage area is hotter than the water outside the periphery of the platform.

3. A solar power station according to claim 1 wherein the spaced parallel walls are subdivided into cells by bulkheads extending at right angles to said walls.

4. A solar power station according to claim 3 where said bulkheads are inclined at an angle to the sun.

5. A solar power station according to claim 4 where the angle of inclination is less than the angle of the maximal sun position.

6. A solar power station according to claim 5 wherein incident radiation of sun rays impinging on said bulkhead is reflected only once.

7. A solar power station according to claim 1 wherein a portion of the water space beneath said platform is subdivided by an intermediate partition into an upper region and a lower region with the lower region being beneath the upper region and wherein the lower region is filled with hotter water than water filling the upper region.

8. A solar power station according to claim 7 wherein said intermediate partition is weighed down by weights and is maintained in position by a plurality of floats.

9. A solar power station according to claim 8 wherein said partition has a plurality of caissons for containing water and wherein the interior of the caissons is in hydraulic communication with hot water located beneath said partition.

10. A solar power station according to claim 8 wherein said weights comprise sand.

11. A solar power station according to claim 7 wherein said partition has a plurality of caissons for containing water and means to control water level in said caissons.

12. A solar power station according to claim 7 wherein said intermediate partition has a jacket depending from its outer periphery having a wall thickness which decreases as it extends from said partition and wherein the space beneath the partition and surrounded by the jacket forms a heat storage accummulator.

13. A solar power station according to claim 12 wherein said jacket is connected to said partition by a beading in the form of a torus and having a buoyancy equal to the submerged weight of the jacket.

14. A solar power station according to claim 12 wherein the jacket has an inner surface lined with a porous insulation substance the pores of which are adapted to be filled with water.

15. A solar power station according to claim 7 wherein the height of the water in the upper region generates a hydraulic pressure greater than the vapor pressure of the water in the lower region.

16. A solar power station according to claim 1 wherein said underwater thermal storage areas comprise heat storage accumulators and wherein cold water is heated to warm water by said first group of collectors and warm water is heated to hot water by said second group of collectors.

17. A solar power station according to claim 1 having means for feeding and extracting water from said thermal storage areas with said means comprising at least one tube one end of which is hydraulically connected to portions exterior of the storage areas and the other end of which may be raised to different levels within the storage areas.

18. A solar power station according to claim 1 having a turbine driven by a working fluid and wherein the working fluid needs more heat for increase of temperature in the liquid stage than for evaporation at the level of maximum circuit temperature.

19. A solar power station according to claim 18 wherein the working fluid is heated by extracting heat out of different layers of water in the heat storage areas having different temperatures.

20. A solar power station according to claim 18 wherein the working fluid comprises butane.

21. A solar power station according to claim 1 wherein said solar radiation absorbing layer comprises in part a photovoltaic layer for generating direct current electricity.

* * * * *